J. F. WALKER.
Corn-Planter.
No. 220,684.  Patented Oct. 14, 1879.
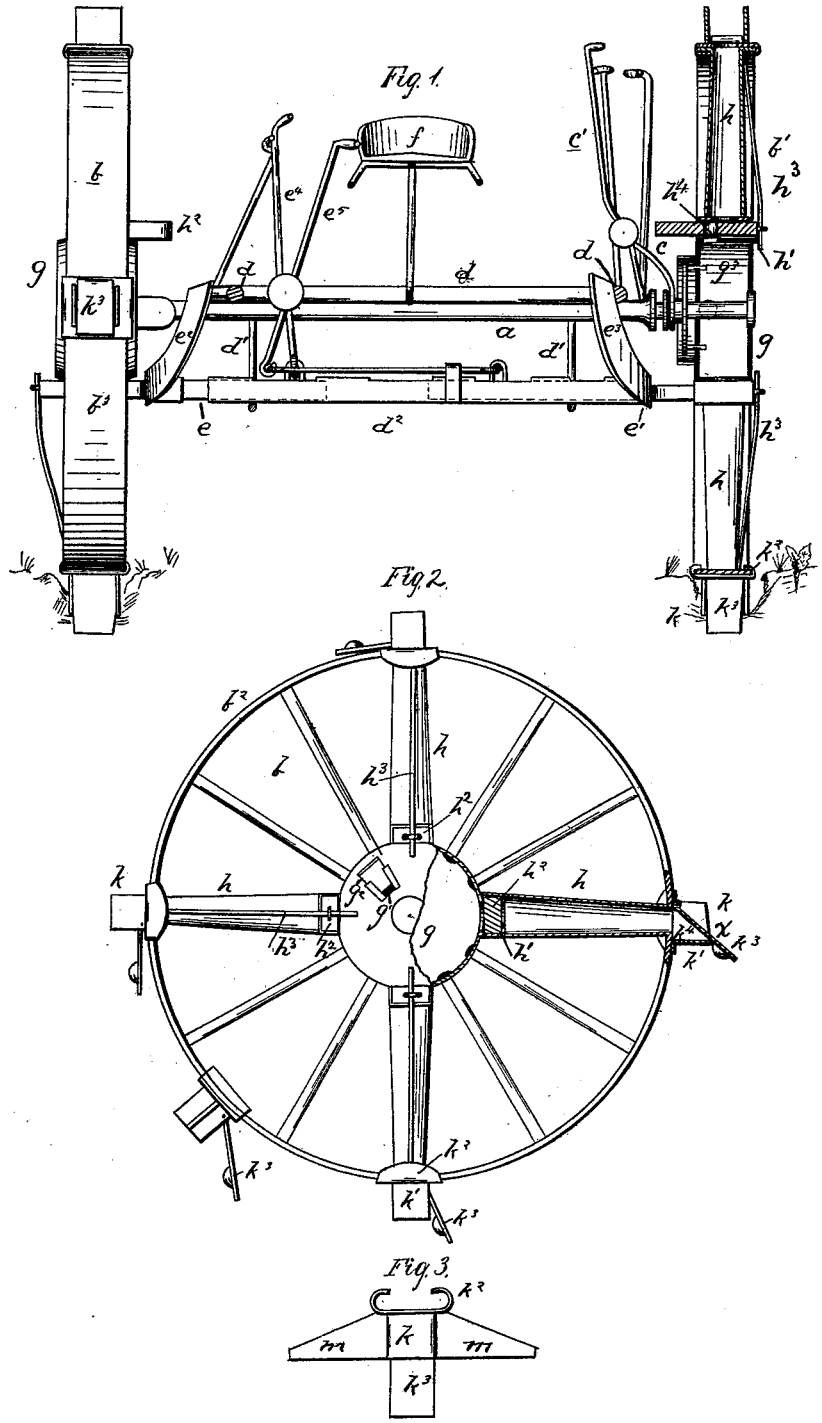

UNITED STATES PATENT OFFICE

JAMES F. WALKER, OF WHITEHALL, ILLINOIS.

IMPROVEMENT IN CORN-PLANTERS.

Specification forming part of Letters Patent No. 220,684, dated October 14, 1879; application filed June 28, 1879.

*To all whom it may concern:*

Be it known that I, JAMES F. WALKER, of Whitehall, in the county of Green and State of Illinois, have invented certain new and useful Improvements in Corn-Planters, and do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has for its object to furnish a planter which will drop and cover two rows at a time, and by which is obviated the difficulty of gain or loss in the dropping mechanism when the machine is used on uneven ground.

It consists in having the grain-boxes, dropping-slides, and other dropping and covering mechanism all united in and forming a part of the wheels on which the frame is supported, all of which will be hereinafter fully explained.

In the drawings, Figure 1 is a front elevation, showing one of the wheels in vertical section, and with the hitching attachments removed. Fig. 2 is a side elevation, partly in section, of one of the wheels. Fig. 3 shows a plunger attachment with marking-wings.

$a$ is the axle, on which the wheels $b\ b^1$ are supported, and to which the levers and other mechanism are attached. The wheel $b$ is rigidly attached to and turns with the axle $a$. The wheel $b^1$ is supported on the axle so that it will turn thereon. On the axle is also placed a clutch, $c$, moved by a lever, $c'$, which is adapted to engage with the side of the hub of the wheel $b^1$ and hold the latter so that it will turn with the axle and simultaneously with the wheel $b$.

To the axle. I affix the thills $d\ d$, or other means to which the horse or horses are attached. To the thills or framing $d$, I attach, by suitable hangers $d^1$, a guide bar or trough, $d^2$, in which I place the sliding bars $e\ e^1$, on the outer ends of which are fixed cams $e^2\ e^3$. The bars are moved outward toward or inward away from the wheels by the levers $e^4\ e^5$. $f$ is the driver's seat, supported on standards affixed to the frame $d$.

Each wheel $b\ b^1$ is constructed with a hollow hub, $g$, within which the grain is put. This hollow hub is provided with an opening, $g^1$, closed by a slide or other suitable door, $g^2$. $h\ h$ are a series of hollow spokes, arranged at regular distances around the hub, and connected with the grain-chamber and with the the rim $b^2$ of either wheel, which is perforated, as shown, to permit the grain to drop into the ground. The inner end of the hollow spoke is so attached as to leave a cross-opening, $h^1$, through it at the periphery of the hub $g$. Within this opening I place a slide-bar, $h^2$, the outer end of which is pressed by a spring, $h^3$, while its inner end projects beyond the spoke, so that it will strike against the cam $e^2$ or $e^3$ when the latter is thrown outward toward the wheel.

The hub is perforated by a hole, $g^3$, which lets the grain into the gage-hole $h^4$ in the slide-bar $h^2$. The grain is received into the hole $h^4$, and afterward the proper movement of the slide lets it drop into the hollow spoke, which carries it down through the wheels $b^1$ or $b^2$ and deposits it in the ground.

Over the opening of the hollow spoke in the wheels $b^1$ or $b^2$, I place a plunger, $k$, which is attached by any suitable means, so as to be held rigidly in place during the operation of the machine.

When the machine is not employed in dropping grain the plungers are removed and placed in a suitable box attached to the frame, after which the machine can be taken onto the roads and moved from place to place without injury.

The plunger $k$ is composed of a rectangular spout, $k^1$, open at its ends and on one side, and provided with wings or flanges $k^2$, by which it is attached to the wheels $b^1$ or $b^2$. On its side, close down to its flanges, I hinge a blade, $k^3$, so constructed and arranged that it will turn into the spout $k^1$, as shown at $x$, Fig. 2. This blade has on it a small weight, which causes it to drop more readily into the spout as the wheel revolves. As the wheel revolves and the plunger is brought over to the front the blade $k^3$ drops into its position, as shown at $x$, Fig. 2, and forms a small triangular space, $k^4$, into which the grain is dropped when the spoke $h$ reaches the vertical line below the hub. When the plunger reaches the ground the blade and spout are forced into the earth by the weight of the wheels and machine. At the same time the slides $h^2$ are engaged by the cams $e^2$ $e^3$ and are pushed outward, receive the grain, and when they clear the cam are thrown back by the spring $h^3$ and drop the grain through the spoke into the triangular chamber $k^4$. The further revolution of the wheel turns the blade back out of and opens the end of the spout, so that the grain is dropped into the opening in the ground formed by the plunger $k$.

The cams $e^2$ $e^3$ may be drawn away from the wheels, so that the slides $h^2$ will not be removed, and either one may be fixed to operate the slides of its own wheel, while the slides of the other wheel can be left idle, so that, if desired, one row only will be planted.

In Fig. 3 I have shown the plunger $k$ provided with two wings, $m$, which project laterally from opposite sides, and are designed to better mark the location of the hill planted. Plungers so constructed may be employed; but ordinarily I find the plunger without wings gives satisfactory results.

The operation of the machine will be readily comprehended from the description hereinbefore given.

When the end of a row is reached the dropping mechanism is thrown out of gear by moving the cams $e^2$ $e^3$ away from the slides. The clutch $c$ is disengaged and the machine can then be turned.

By means of the marks made the machine can be readily arranged to plant the first hills of the next rows in proper line. If the plungers are not in proper line, the wheel can readily be lifted and turned to bring the said plungers in proper line, after which the horses are driven forward and the planting proceeds.

This planter is light enough to be drawn by one horse; but two may be used, if desired. The draft is light, and the action of the dropping devices is perfect.

The number of hollow spokes employed may be varied according to the pleasure of the manufacturer. In the device represented in my drawings I have four hollow spokes. In case it should be desired to drop the grain at greater distances, two or three of the slides can be thrown back and fastened, so that they will not be touched by the cams $e^2$ $e^3$, while the remaining slides will do the dropping.

It will also be seen that the dropping can be done by one wheel at a time.

In planting small seeds which need but to be on the surface of the ground, the plungers need not be used, and a small field-roller can be rigged to run in rear of the wheels, which will press the seeds deep enough into the ground.

What I claim as my invention is—

In a seeding-machine supported on wheels $b$ $b^1$, constructed with hollow hubs and spokes, as described, the plunger $k$, constructed with the rectangular spout $k^1$, open on one side, and having the blade $k^3$ hinged thereto, so that it will turn into and its end project beyond the end of said spout, and having the flanges $k^2$ arranged so that it may readily be attached to or detached from the rim of said wheel, substantially as and for the purposes set forth.

In testimony that I claim the foregoing as my own I affix my signature in presence of two witnesses.

JAMES F. WALKER.

Witnesses:
G. W. ARMSTRONG,
F. M. PATTERSON.